United States Patent [19]

Etter

[11] 3,928,084

[45] Dec. 23, 1975

[54] TIP FOR AN INDUSTRIAL GAS CUTTING TORCH AND METHOD OF USING SAME

[76] Inventor: Berwyn E. Etter, P.O. Box 11965, St. Petersburg, Fla. 33733

[22] Filed: June 7, 1974

[21] Appl. No.: 477,631

[52] U.S. Cl. .................... 148/9; 266/23; 239/424
[51] Int. Cl.² .................................. B23K 7/02
[58] Field of Search ............ 148/9; 239/424, 424.5; 266/23 R, 23 T

[56] References Cited
UNITED STATES PATENTS

| | | | |
|---|---|---|---|
| 570,656 | 11/1896 | Barrett | 239/424 |
| 2,397,349 | 3/1946 | Hartung | 239/424.5 |
| 2,425,709 | 8/1947 | Bucknam et al. | 239/424 |
| 2,425,710 | 8/1947 | Bucknam et al. | 239/424.5 |
| 2,484,891 | 10/1949 | Jones | 148/9 |
| 2,582,268 | 1/1952 | Nerad | 148/9 X |
| 3,172,457 | 3/1965 | Hartmann et al. | 239/424.5 |

Primary Examiner—Roy Lake
Assistant Examiner—Paul A. Bell
Attorney, Agent, or Firm—Zarley, McKee, Thomte & Voorhees

[57] ABSTRACT

A burning tip for an industrial gas cutting torch comprising an elongated hollow outer shell element having an insert mounted therein. The lower end of the insert terminates inside and spaced from the lower end of the hollow shell element to provide a compartment therein. The lower end of the outer shell element is provided with an inwardly extending annular shoulder which creates interference for the combustible gases so that gas turbulence is created within the compartment to enhance the oxygen-gas mixture therein to improve combustion. The configuration of the shoulder and its relationship to the compartment results in a mushroom-shaped preheating flame.

1 Claim, 4 Drawing Figures

U.S. Patent    Dec. 23, 1975    3,928,084
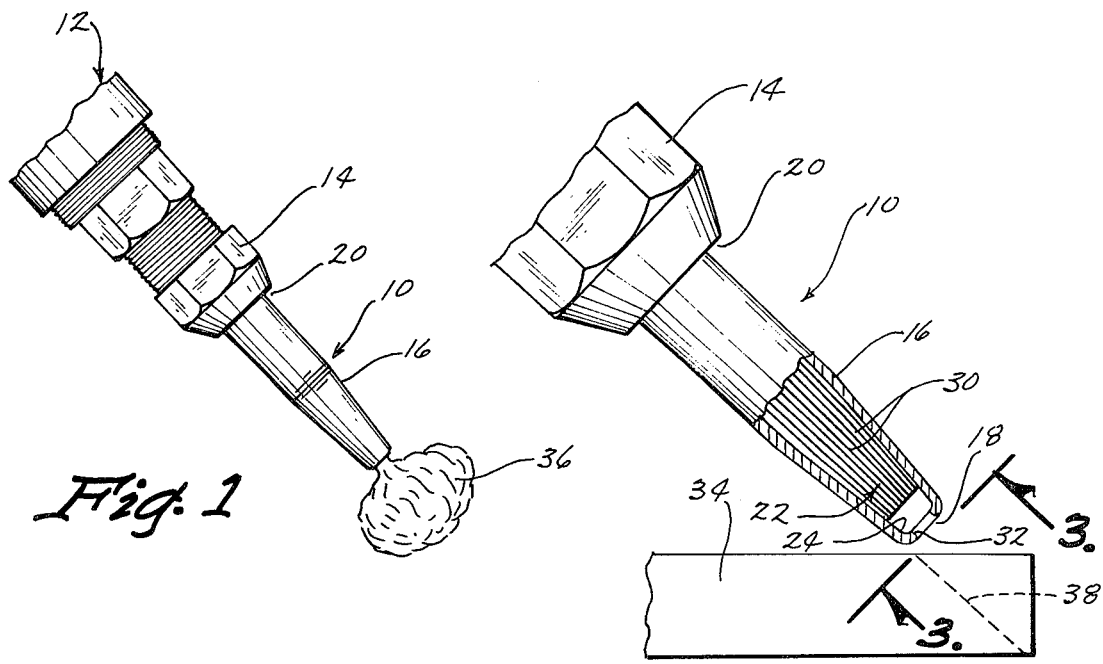
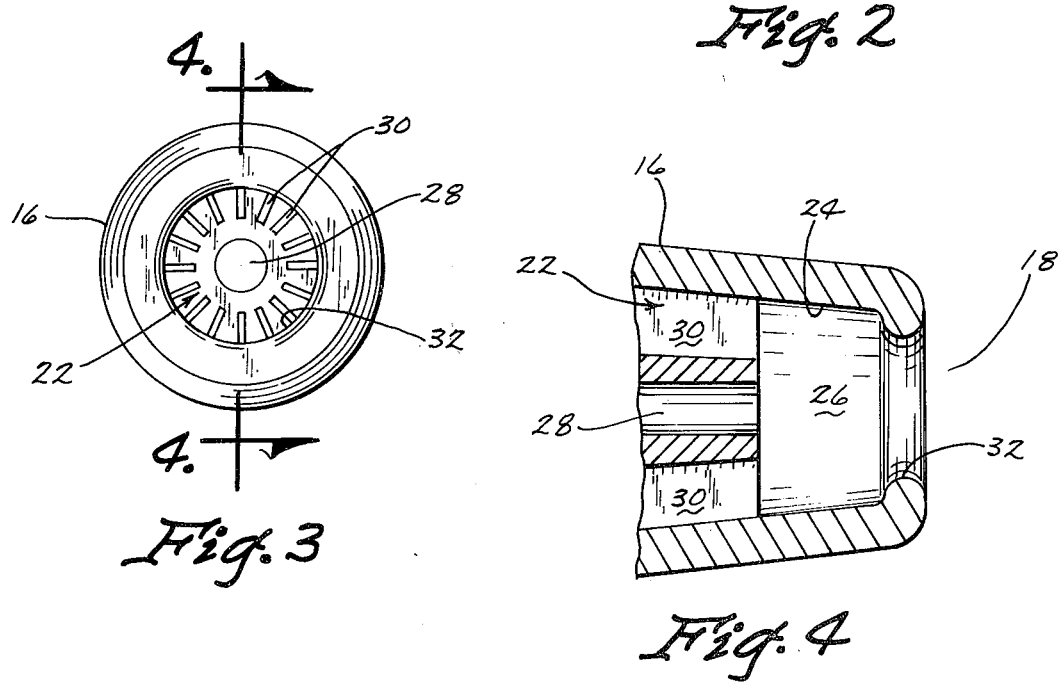

TIP FOR AN INDUSTRIAL GAS CUTTING TORCH AND METHOD OF USING SAME

BACKGROUND OF THE INVENTION

This invention relates to a burning tip for an industrial gas cutting torch and more particularly to a burning tip which creates a mushroom-shaped preheating flame.

Conventional tips for cutting torches ordinarily taper from their base end to the tip end thereof and include an outer shell element having an insert provided therein which extends completely to the tip end of the outer shell element. The preheating flame at the tip end is disposed generally parallel to the longitudinal axis of the body of the tip. If a bevel is to be cut in a sheet or plate, the tip is ordinarily maintained in an inclined relationship with respect to the sheet so that the preheating flame is disposed at the angle of the desired bevel. In such an attitude, the preheating flame tends to bounce off the sheet which substantially reduces the efficiency of the cutting action.

Therefore, it is a principal object of this invention to provide an improved tip for an industrial gas cutting torch.

A further object of the invention is to provide a tip for an industrial gas cutting torch which is designed so as to form a bevel in the material being cut.

A further object of the invention is to provide a tip for an industrial gas cutting torch which causes a mushroom-shaped preheating flame to be produced.

A further object of the invention is to provide a tip for an industrial gas cutting torch including a compartment provided in the lower end thereof.

A further object of the invention is to provide a tip for an industrial gas cutting torch having means thereon for achieving an improved oxygen-gas mixture and combustion thereof.

A still further object of the invention is to provide a burning tip for an industrial gas cutting torch which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a side view of the tip as it would be disposed when forming a bevel in a sheet member:

FIG. 2 is a side view similar to FIG. 1 with portions thereof cutaway to more fully illustrate the invention:

FIG. 3 is an enlarged sectional view seen on lines 3—3 of FIG. 2; and

FIG. 4 is an enlarged sectional view seen on lines 4—4 of FIG. 3.

SUMMARY OF THE INVENTION

A burning tip for an industrial cutting torch comprising a hollow outer shell member having an insert mounted therein. The lower end of the insert terminates in a spaced relationship with the lower end of the outer shell element so as to provide a compartment area above the lower end of the outer shell element. An inwardly extending annular shoulder is provided on the lower end of the outer shell element for providing interference for the combustible gases so that turbulence is created within the compartment to achieve an enhanced oxygen-gas mixture. The annular shoulder contributes to the creation of the turbulence with a mushroom-shaped preheating flame resulting.

DESCRIPTION OF THE PREFERRED EMBODIMENT

The burning tip of this invention is referred to generally by the reference numeral 10 while the reference numeral 12 refers generally to the head portion of a conventional cutting torch. Tip 10 is maintained on the head 12 by nut 14. Head 12 has a suitable bore formed therein which would be in communication with a source of oxygen. Head 12 would also be provided with a plurality of conventional bores formed therein which would be in communication with a source of an oxygen and industrial gas mixture as will be described in more detail hereinafter.

Tip 10 comprises an elongated hollow shell element 16 having a lower end 18 and an upper end 20. The upper end 20 would ordinarily be provided with a suitable outwardly extending flange to facilitate the attachment of the tip to the head 12 by the nut 14. The numeral 22 refers to an insert which is mounted in the interior of the shell element 16 in the manner illustrated in FIGS. 2 and 4. As seen in FIG. 4, the outer wall of insert 22 engages the inner wall 24 of shell element 16. As best illustrated in FIG. 4, the lower end of insert 22 terminates in a spaced relationship with the lower end of the shell element 16 so as to provide a compartment or cavity 26 above the lower end of the shell element 16. Insert 22 is provided with a longitudinally extending bore 28 formed therein which is in communication with the bore in the head 12 which is in communication with the source of oxygen. A plurality of grooves or passageways 30 are formed in the periphery of the insert 22 and extend from one end to the other end thereof and are in communication with the plurality of bores in the head 12 which are in communication with the oxygen and industrial gas mixture. Shell element 16 is provided with an inwardly extending annular shoulder 32 at its lower end as best illustrated in FIG. 4.

In operation, the tip 10 would be oriented with respect to the plate or sheet material 34 as illustrated in FIG. 2. The tip 10 could either be mounted on a hand cutting torch or a machine mounted cutting torch as desired. If a bevel is to be formed in the member 34, the tip 10 is oriented so that the longitudinal axis thereof is disposed in the direction of the bevel cut as seen in FIG. 2. The oxygen and gas mixture is supplied to the compartment 26 by way of grooves 22 while cutting oxygen is furnished to the compartment 26 through the bore formed in the head 12 and the bore 28 in insert 22.

The annular shoulder 32 creates interference for the combustible gases so that great turbulence is created within the compartment 26. The turbulence within the compartment 26 provides an improved oxygen-gas mixture therein and is believed to improve combustion of the gases. The shoulder 32 contributes to the creation of the turbulence in the compartment 26 so that a mushroom-shaped preheating flame 36 (FIG. 1) results. The turbulence of the preheating flame outside the tip picks up free oxygen from the air which also enhances the combustibility of the preheating flame. As previously stated, conventional tips cause the preheating flame to ricochet off the surface of the material to be bevel cut but the mushroom-shaped preheating flame 36 does not do so which enhances the making of bevel cuts. The mushroom-shaped preheating flame 36 is three-dimensional but in spite of its unusual shape, the cut will appear on the dotted line 38 of FIG. 2.

Thus it can be seen that an improved burning tip has been provided for an industrial gas cutting torch which enhances the creation of bevel cuts in a much improved manner. Therefore, it can be seen that the tip accomplishes at least all of its stated objectives.

I claim:

1. The method of cutting a beveled edge on a sheet of flat material with a cutting torch means including a cutting tip having a longitudinal axis said cutting tip being configured so as to produce a mushroom-shaped preheating flame, comprising, holding the cutting tip so that its longitudinal axis is positioned with respect to said plate in the direction of said bevel cut, creating a mushroom-shaped preheating flame by supplying a combustible gas mixture to said cutting tip and igniting said mixture, and maintaining the mushroom-shaped preheating flame in contact with the plate until the bevel cut has been made.

* * * * *